No. 688,448. Patented Dec. 10, 1901.
J. THOMPSON.
COMBINED GATE AND STEP FOR WAGONS.
(Application filed Sept. 23, 1901.)
(No Model.)
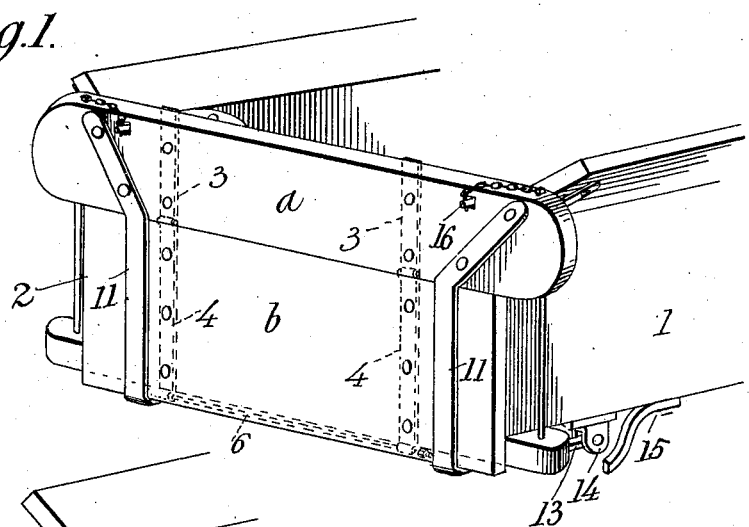
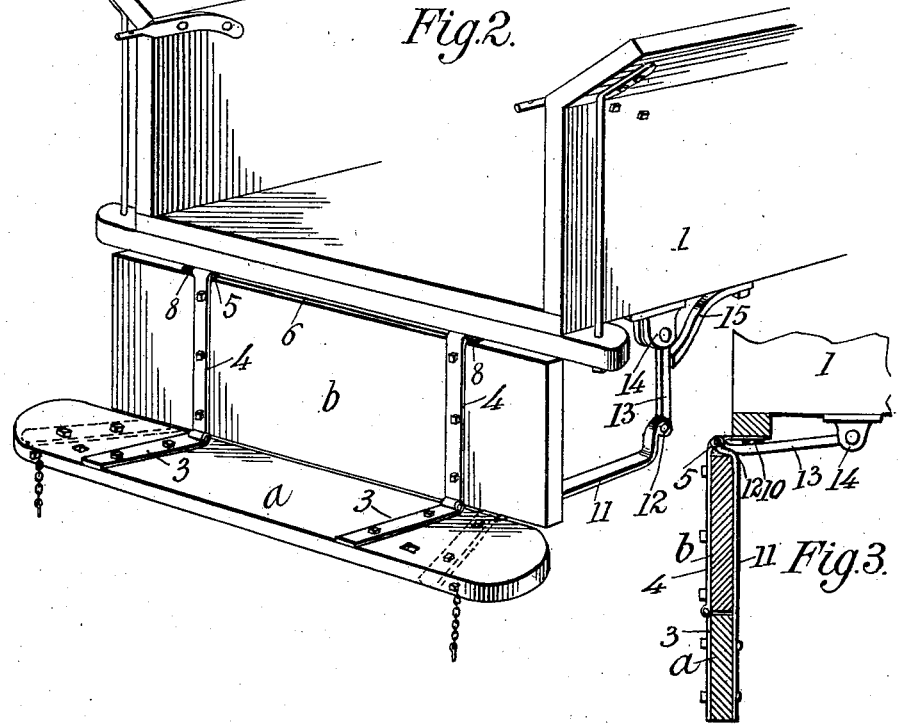
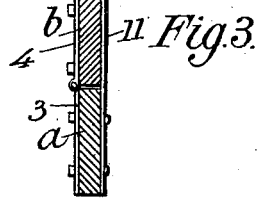
James Thompson Inventor

UNITED STATES PATENT OFFICE.

JAMES THOMPSON, OF GREELEY, COLORADO.

COMBINED GATE AND STEP FOR WAGONS.

SPECIFICATION forming part of Letters Patent No. 688,448, dated December 10, 1901.

Application filed September 23, 1901. Serial No. 76,189. (No model.)

*To all whom it may concern:*

Be it known that I, JAMES THOMPSON, a citizen of the United States, residing at Greeley, in the county of Weld and State of Colorado, have invented certain new and useful Improvements in a Combined End-Gate and Step; and I do declare the following to be a full, clear, and exact description of the invention, such as will enable others skilled in the art to which it appertains to make and use the same.

The invention relates to a combined end-gate and step for vehicles.

The objects of the invention are to provide a device of this character which may be easily converted from an end-gate to a step, and vice versa, and which when used for either purpose will fill all requirements; furthermore, to provide a device of this character which when folded from its position as an end-gate may at will be used as a step or, if desired, may be lowered, with the parts thereof extending in a vertical plane, so as to permit of the vehicle being backed against a platform without injury to the combined end-gate and step, and, finally, to provide a device of this character which shall be simple of construction, durable in use, and comparatively inexpensive of production.

With these and other objects in view the invention consists of certain novel features of construction, combination, and arrangement of parts, which will be hereinafter more fully described, and particularly pointed out in the appended claim.

In the accompanying drawings, Figure 1 is a detail perspective view illustrating my invention applied to an ordinary farm-wagon, although it should be borne in mind that the invention is equally applicable to other forms of vehicles, the device being shown when used as an end-gate. Fig. 2 is a similar view, the device being shown in the position when used as a step. Fig. 3 is a longitudinal vertical sectional view through the rear end of the body of the vehicle with the end-gate swung down and the step portion thereof extending parallel with the other portion, in which position the vehicle may be backed up against a platform.

In the drawings, 1 denotes the body of the vehicle, and 2 the end-gate, which consists of the members *a* and *b*, which are connected together by hinged straps 3 and 4, secured to the inner sides of the members *a* and *b*, the straps 3 being formed at their lower ends with eyes 5, which are connected to a rod 6, which in turn is supported by eyes 8, projecting from the bottom of the vehicle-body, and held in place by nuts 10. Two sets of hinges are thus formed, one set permitting of the movement of section *a* with respect to section *b* and the other set permitting the movement of the section *b* with respect to the body of the wagon.

11 denotes straps, the upper ends of which are secured to the outer sides of the section *a* of the end-gate and extend down parallel to the section *b*, but are not connected thereto, and are formed at their lower ends with eyes 12, which are pivotally connected by links 13 to brackets 14, secured to the under side of the wagon-body. Stops 15 are secured to the under side of the wagon-body in the path of movement of the links 13.

Any suitable means may be employed for locking the device when used as an end-gate. In the position shown in Fig. 1, for instance, lugs 16 may be secured to the side pieces of the wagon-box and project through apertures 17, formed in the section *a*, and pins may be inserted through the free ends of these lugs. When the device is in the position shown in Fig. 1 of the drawings, if it be desired to load the wagon—for instance, with sacks of potatoes or grain—the end-gate is unfastened and is lowered to the position shown in Fig. 2, in which position the stop 15 will be within the path of movement of the link 13 and will act as a brace to hold the horizontally-extended section *a*, which now becomes a step, in proper position. The sacks may now be loaded into the wagon by a person entering at the rear of the wagon, and thus the wagon may be more easily and expeditiously loaded than when it is necessary to fill in from the tail end of the wagon and then climb up over the sides of the wagon and draw the sacks up to the forward end thereof. If it be desired to load or unload from a platform, the straps 11 and the links 13 may be moved to the position shown in Fig. 3, thus allowing the section *a* to hang in a vertical position, as shown, so that the vehicle may be moved close to the platform.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

The combination with the body of a vehicle, of an end-gate consisting of two sections hinged together and hinged to the body of the vehicle, straps fixed to the uppermost section of the end-gate, brackets secured to the body of the vehicle, links connecting the brackets with the straps, and stops carried by the body of the vehicle within the path of movement of the links to hold one section of the end-gate, when lowered, in a position at right angles to the other section, substantially as set forth.

In testimony whereof I have hereunto set my hand in presence of two subscribing witnesses.

JAMES THOMPSON.

Witnesses:
M. C. ALLEN,
A. J. ALLEN.